United States Patent [19]
Chikuma et al.

[11] Patent Number: 5,685,390
[45] Date of Patent: Nov. 11, 1997

[54] ELECTRICALLY-OPERATED POWER STEERING APPARATUS

[75] Inventors: Isamu Chikuma; Kenji Someya; Hiroshi Eda, all of Maebashi, Japan

[73] Assignee: NSK, Ltd., Tokyo, Japan

[21] Appl. No.: 401,894

[22] Filed: Mar. 10, 1995

[30] Foreign Application Priority Data

Mar. 17, 1994 [JP] Japan .................................. 6-047026
Jul. 8, 1994 [JP] Japan .................................. 6-157336

[51] Int. Cl.⁶ .................................................. B62D 5/04
[52] U.S. Cl. ........................... 180/444; 74/89.15; 384/491; 384/521; 384/604
[58] Field of Search .................................. 180/443, 444, 180/446; 384/521, 491, 604, 494; 74/216.3, 424.8 R, 89.15

[56] References Cited

U.S. PATENT DOCUMENTS

| | | | |
|---|---|---|---|
| 3,880,481 | 4/1975 | George | 384/521 |
| 4,221,137 | 9/1980 | Futaba | 74/216.3 |
| 4,577,715 | 3/1986 | Saito . | |
| 5,437,349 | 8/1995 | Kurahashi et al. | 180/443 |

FOREIGN PATENT DOCUMENTS

| | | | |
|---|---|---|---|
| 0532289 | 10/1956 | Canada | 384/521 |
| 821265 | 12/1937 | France . | |
| 42 35 842 | 4/1994 | Germany . | |
| 60-179944 | 11/1985 | Japan . | |

OTHER PUBLICATIONS

Patent Abstracts of Japan, vol. 10, No. 357 (M–540), Dec. 2, 1986 (JP–A–61 153 051).
Patent Abstracts of Japan, vol. 6, No. 260 (M–180), Dec. 18, 1982 (JP–A–57 154 552).

Primary Examiner—Anne Marie Boehler
Attorney, Agent, or Firm—Shapiro and Shapiro

[57] ABSTRACT

An electrically-operated power steering apparatus comprises a steering shaft, a rack shaft capable of linear movement for turning a steering running wheel a, rack-pinion gear for coupling the steering shaft with the rack shaft, and a ball screw mechanism including a screw groove formed on the rack shaft, a rotary ball screw nut fitted on the rack shaft, and plural balls positioned in a rolling path. The plural balls are comprised of bulbs of a larger diameter and balls of a smaller diameter, which are alternately arranged, and the smaller diameter is within a defined range.

6 Claims, 6 Drawing Sheets

| FIG.4A | FIG.4B |

ELECTRICALLY-OPERATED POWER STEERING APPARATUS

BACKGROUND OF THE INVENTION

1. Field of the Invention

The present invention relates to an electrically-operated power steering apparatus.

2. Related Background Art

In the field of electrically-operated power steering apparatus for vehicles, there is already known, as disclosed for example in U.S. Pat. No. 4,577,715, a type in which the rotary power of an electric motor is converted by a ball screw mechanism into a linear movement for directly driving a rack shaft. The ball screw mechanism employed in such conventional electrically-operated power steering apparatus is comprised of a ball screw shaft connected to the rack shaft, movable only in the axial direction and provided with an external screw groove on the external periphery thereof, a nut member connected to the electric motor, provided rotatably about said rack shaft and provided with an internal screw groove on the internal periphery thereof, and plural balls capable of rolling between said external and internal screw grooves.

When the rotary power from the electric motor rotates the nut member, the unrotatably supported ball screw shaft axially moves relative to the nut member, in proportion to the pitch of the screw groove. The plural balls are provided in succession, with a predetermined interval, in said screw grooves and serve to reduce the frictional force generated between the nut member and the ball screw shaft at the rotation of said nut member.

In such ball screw mechanism, when a large force is transmitted between the nut member and the ball screw shaft (a high load state), the balls are pressed with a relatively strong force by the both screw grooves, and a relatively strong frictional force for rolling the balls is generated between the balls and the screw grooves. Also when the balls rolling in one direction come into mutual contact, there is generated a frictional force to mutually suppress the rotation between said balls, but the power transmission can be achieved without difficulty because such frictional force between the balls is weaker than that between the balls and the grooves.

By contract in a low load state in which a small force is transmitted between the nut member and the ball screw shaft, the groove-ball frictional force may become lower and comparable to the frictional force between the balls. In such case, there may result a phenomenon of instantaneous transition from a state in which the balls rotate in one direction to a state in which the balls are stopped and merely slide relative to both screw grooves. When such phenomenon occurs, the power transmission cannot be conducted smoothly between the nut member and the ball screw shaft, and the operator of the steering wheel receives an unpleasant feeling as if the steering wheel "sticks".

In order to prevent such sticking phenomenon, there is already proposed a mechanism of floating support for the ball screw nut. However, for such floating support of the ball screw nut, there is required, in addition to a bearing for supporting the ball screw nut relative to a housing, a supporting mechanism for floating support of the bearing relative to the housing or of the ball screw nut relative to the bearing, so that there will be required an additional cost as well as a mounting space for such supporting mechanism.

SUMMARY OF THE INVENTION

The present invention intends to provide an electrically-operated power steering apparatus capable of preventing the sticking phenomenon of the steering wheel, with a compact configuration.

The above-mentioned object can be attained, by an electrically-operated power steering apparatus comprising a steering shaft connected directly to and rotating integrally with a steering wheel, and a rack shaft capable of a linear motion for causing a deflecting motion of steerable vehicle wheels;

rack-pinion gear means including of a pinion gear drivably linked with said steering shaft and said rack shaft and rotating with the rotation of said steering shaft, and a rack gear provided on said rack shaft and meshing with said pinion gear, ball screw means consisting of screw means provided on said rack means, rotary nut means surrounding at least a part of said screw means, and plural balls provided in succession in a rolling path formed between said rotary nut means and said screw means for effecting power transmission between said rotary nut means and said screw means, and an electric motor unit connected to said rotary nut means;

wherein said plural balls are comprised of standard-diameter balls of a standard diameter and small-diameter balls periodically positioned among said standard-diameter balls and having a diameter smaller than said standard diameter, said standard diameter Da and said smaller diameter Db being defined by:

$$Db \leq Da - Da/1000.$$

As the small-diameter balls are regularity provided among the standard-diameter balls, the gap of the grooves defined by said standard-diameter balls is somewhat too large for the small-diameter balls. Consequently the groove-ball frictional force which the small-diameter balls receive from the screw grooves becomes smaller than that which the standard-diameter ball receive from the screw grooves, so that each type of balls receives a different rolling force in one direction. Consequently, when a standard-diameter ball and a small-diameter ball are in mutual contact, the small-diameter ball continues the sliding or rolling motion while the standard-diameter ball continues the rolling motion, so that the sticking phenomenon can be avoided. If the diameter of the small-diameter balls is considerably smaller than that of the standard-diameter balls, the force between the screw grooves is entirely received by the standard-diameter balls, so that the transmission capacity is lowered. For this reason there is defined a range for the appropriate diameter of the small-diameter balls.

In the ball screw mechanism, in order to achieve transmission of driving force with smooth change of moving direction between the ball screw shaft and the ball nut, it is particularly necessary to precisely control the gap between the ball and the ball screw shaft at a small value, and for achieving such control, it is common to apply a pressure between the ball screw shaft and the ball nut or to improve the precision of formation of the screw groove on the ball screw shaft.

However, in case of pressure application or groove formation for attaining a small gap, over the entire operating range of the ball screw shaft (entire axial length of movement of the ball nut), a certain fluctuation is unavoidable in the average groove diameter along the axial direction of the ball screw shaft. As a result, there may result a defective conversion of movement or a fluctuation of the driving torque transmitted from the electric motor to the power transmission member, in a part of the ball screw shaft. As a result, the driver experiences an undesirable feeling of steering, through the steering wheel. For avoiding such phenomenon there is required further improvement in the precision of formation of the ball screw groove on the ball screw shaft, leading to an increased cost.

Accordingly, the present invention also aims to provide an electrically-operated power steering apparatus including the ball screw means which incorporates the standard-diameter balls and the small-diameter balls, and which can convert the drive force stably with low cost.

The above-mentioned object can be attained by an electrically-operated power steering apparatus featured by the fact that the diameter of pitch circle of the ball screw groove of said ball screw shaft is made larger than a standard size in a central region corresponding to the neutral position of the steering wheel and is progressively decreased to the standard size as the distance increases in both axial directions from said central region.

When the ball nut is rotated by the rotary driving force transmitted thereto from the electric motor through a clutch, the ball screw shaft constituting the power transmission member moves in the axial direction. In such state, when the ball nut rotates in the central region of the ball screw shaft corresponding to the neutral position of the steering wheel, there will not result a play because of the gap between the balls and the ball screw grooves.

BRIEF DESCRIPTION OF THE DRAWINGS

FIG. 4 is comprised of FIGS. 4A and 4B showing an enlarged cross section of FIG. 3, wherein FIG. 4A is a magnified cross-sectional view of the left-hand portion of principal parts and FIG. 4B is a magnified cross-sectional view of the right-hand portion of principal parts.

DESCRIPTION OF THE PREFERRED EMBODIMENTS

Now an embodiment of the present invention will be explained in detail with reference to the attached drawings.

Figure 1:
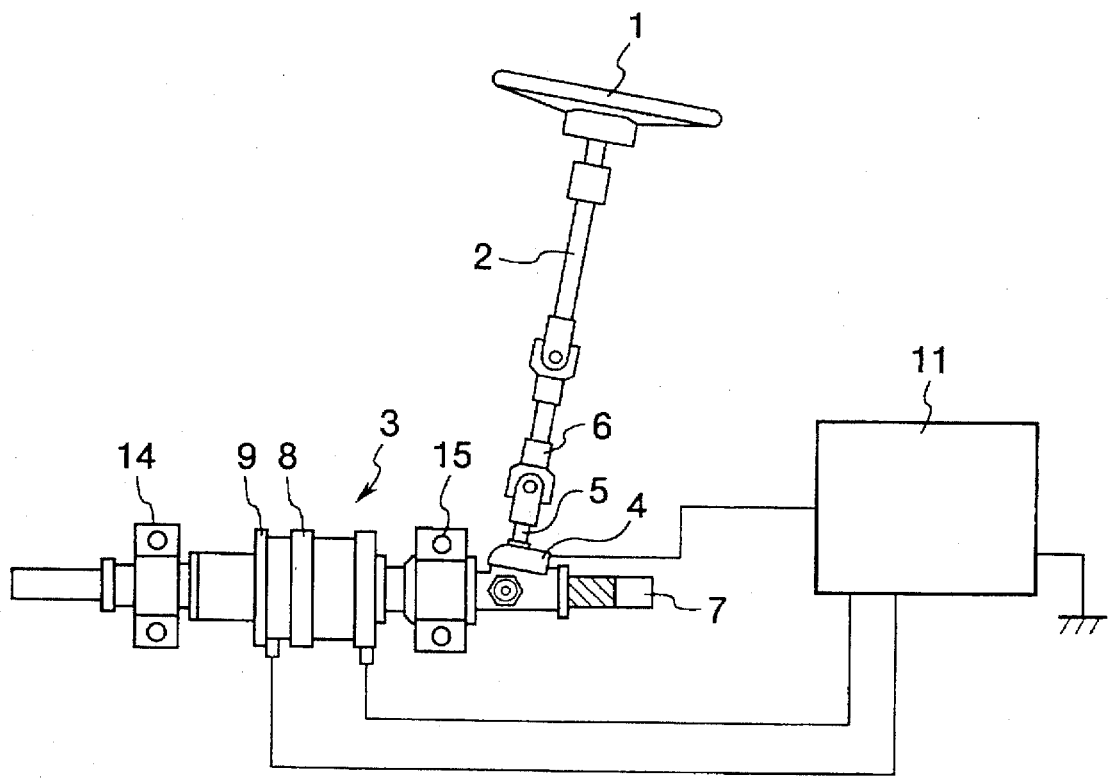
FIG. 1 is a schematic view of an embodiment (electrically-operated power steering apparatus) of the present invention.

Referring to FIG. 1, a steering wheel 1 is integrally mounted at the upper end of a steering shaft 2 and is rotatably supported by an unrepresented body of a vehicle. The steering shaft 2 is linked, by a universal joint 6, to a pinion shaft 5. Said pinion shaft 5 is provided, at the front end thereof, with a pinion gear which meshes with a rack formed on a laterally movable rack shaft 7 in a main body 3, to be explained later, of the steering apparatus, whereby the rotation of the pinion shaft 5 causes, in the already known manner, a movement of the rack shaft 7 in the lateral direction in the drawing.

The pinion shaft 5, for transmitting the rotary force from the steering wheel 1, is provided, on the periphery, with torque detecting means 4, employing a torsion bar which undergoes a torsion in proportion to the received torque. The amount of torque received by the pinion shaft 5 is measured by converting said torsion into an amount in the axial direction and measuring said amount with a Potentionmeter, and is transmitted to a control circuit 11. Said detection means itself is already known, for example as disclosed in the Japanese Utility Model Application Laid-open No. 60-179944, and the detailed structure of such detection means will not, therefore, be explained further.

The main body 3 of the steering apparatus, supported by brackets 14, 15 in the behicle body (not shown), constitutes a movement converting unit for converting the steering rotary input force into a linear movement for deflecting the steering running wheels (not shown) of the vehicle, and is provided with a motor unit 8 for power supplement. The motor unit 8 and a clutch unit 9 are electrically connected to the control circuit 11. Under the control by said control circuit 11, the rotary output power of the motor unit 8 is transmitted by the clutch unit 9, and is converted into a linear movement by the main body 3 of the steering apparatus, for driving the rack shaft 7. The output transmission system from the motor unit 8 to the rack shaft 7 will be explained in more detail with reference to FIG. 2, which is a magnified cross-sectional view of said main body 3 shown in FIG. 1.

A three-division housing 30 comprising a left-hand portion 30a, an intermediate portion 30b and a right-hand portion 30c, all in tubular form, is mounted around the rack shaft 7, by means of the brackets 14, 15 (see. FIG. 1) fixed to the vehicle body. The motor unit 8 is formed in the right-hand portion 30c. More specifically, a tubular permanent magnet 29 is fixed on the internal periphery of the right-hand portion 30c, and, at the inside thereof, a similarly substantially cylindrical armature 32 is mounted around a cylindrical sleeve 17, which is supported rotatably, relative to the housing 30, by means of bearing 31 (only one is illustrated).

At the left-hand end of the armature 32, there is mounted a contactor 33, and therearound provided is an annular brush 35 supported by a brush holder 34 mounted on the housing 30. Electric power is supplied from the control circuit 11 to said brush 35 when required, thereby rotating the armature 32 and the sleeve 17 with a torque corresponding to said electric power.

The clutch unit 9 is formed in the intermediate portion 30b. A male spline 7a is formed on the left-hand end of the sleeve 17, while a female spline 37a is formed on the internal periphery of a substantially annular friction plate holder 37 with a central aperture, and said friction plate holder 37 is rendered incapable of relative rotation to the sleeve 17 by the mutual engagement of said splines. To the right of the friction plate holder 37, a solenoid 39, supported by the housing 30 by means of a solenoid holder 38, is so provided as to directly oppose to the friction plate holder 37. Electric power is supplied from the control circuit 11 shown in FIG. 1 to the solenoid 39 when required, thereby generating magnetic force therefrom.

On the left-end face of the friction plate holder 37, positioned next to the solenoid 39, there is adhered a friction plate 37b, which is positioned facing a disk-shaped clutch plate 40 composed of a magnetic material. Upon generation of magnetic force by the solenoid 39, the clutch plate 40 is biased toward the solenoid 39, whereby the friction plate 37b is pressed between the clutch plate 40 and the friction plate holder 37, thus generating a frictional force required for the transmission of the rotary force. In this manner the clutch 9 engages or disengages respectively by an engagement signal or a disengagement signal from the control circuit 11. The clutch plate 40 is supported by plural connecting screws 41 and is rendered adjustable, in the axial direction relative, to an annular transmission member 43, by means of said connecting screws 41. Said annular transmission member 43 is supported by a bearing 42, rotatably with respect to the sleeve 17 and is fitted to the right-hand end of a ball screw nut 44.

The substantially cylindrical ball screw nut 44 is supported by bearings 45, 46, rotatably with respect to the housing 30. Said ball screw nut 44 is provided therein with an internal screw groove 44a, opposed to an external screw groove 7b formed in the left-hand portion of the rack shaft 7 to constitute a rolling path, in which plural balls 47 are contained. Said balls 47 are provided for the purpose of reducing the frictional force generated at the sliding rotation of the ball screw nut 44 and the rack shaft 7. The ball screw nut 44 is provided therein with a circulating path (not shown), along which the balls 47 can be circulated at the operation. The internal and external screw paths 44a, 7b constitutes screw means, and the ball screw nut 44 constitute rotary nut means.

The balls 44 are comprised of balls of a standard diameter and balls of smaller diameter. The diameter Db of said small-diameter balls in the present embodiment is defined by Da−4Da/1000, wherein Da is the diameter of the standard-diameter balls. The standard-diameter balls and the small-diameter balls are provided alternately and in succession in the rolling path.

At the left-hand end of the housing 30 there is screwed on a cover member 48 for supporting the ball screw nut 44 together with the housing 30, thereby preventing the axial movement of said ball screw nut 44. A locking nut 49 is mounted for avoiding the rotation of said cover member 48. The cover member 48 is further provided with a boot member 50, for protecting the rack shaft 7 from dust.

In the following there will be explained the function of the present embodiment.

When the vehicle is moving straight and the rotary force is not entered from the steering wheel 1 to the pinion shaft 5, no substantial torque signal is released from the torque detector 4. Consequently the control circuit 11 does not supply the motor unit 8 with the rotation drive signal, and the electrically-operated power steering apparatus does not provide the auxiliary steering force.

On the other hand, when the vehicle is going to proceed along a curved path, the steering wheel 1 is operated to transmit a rotary force to the pinion shaft 5, whereby the torque detector 4 sends a signal, corresponding to the steering torque, to the control circuit 11, which in response provides the motor unit 8 with a rotary drive signal of a value predetermined corresponding to the steering torque. Thus the electrically-operated power steering apparatus provides an auxiliary steering force corresponding to the steering force.

In an abnormal situation such as the abnormality in the output of the steering torque, the control circuit 11 provides the clutch unit 9 with a disengagement signal to effect a disengaging operation, thereby disconnecting the ball screw nut 44 from the motor unit 8.

Figure 2:
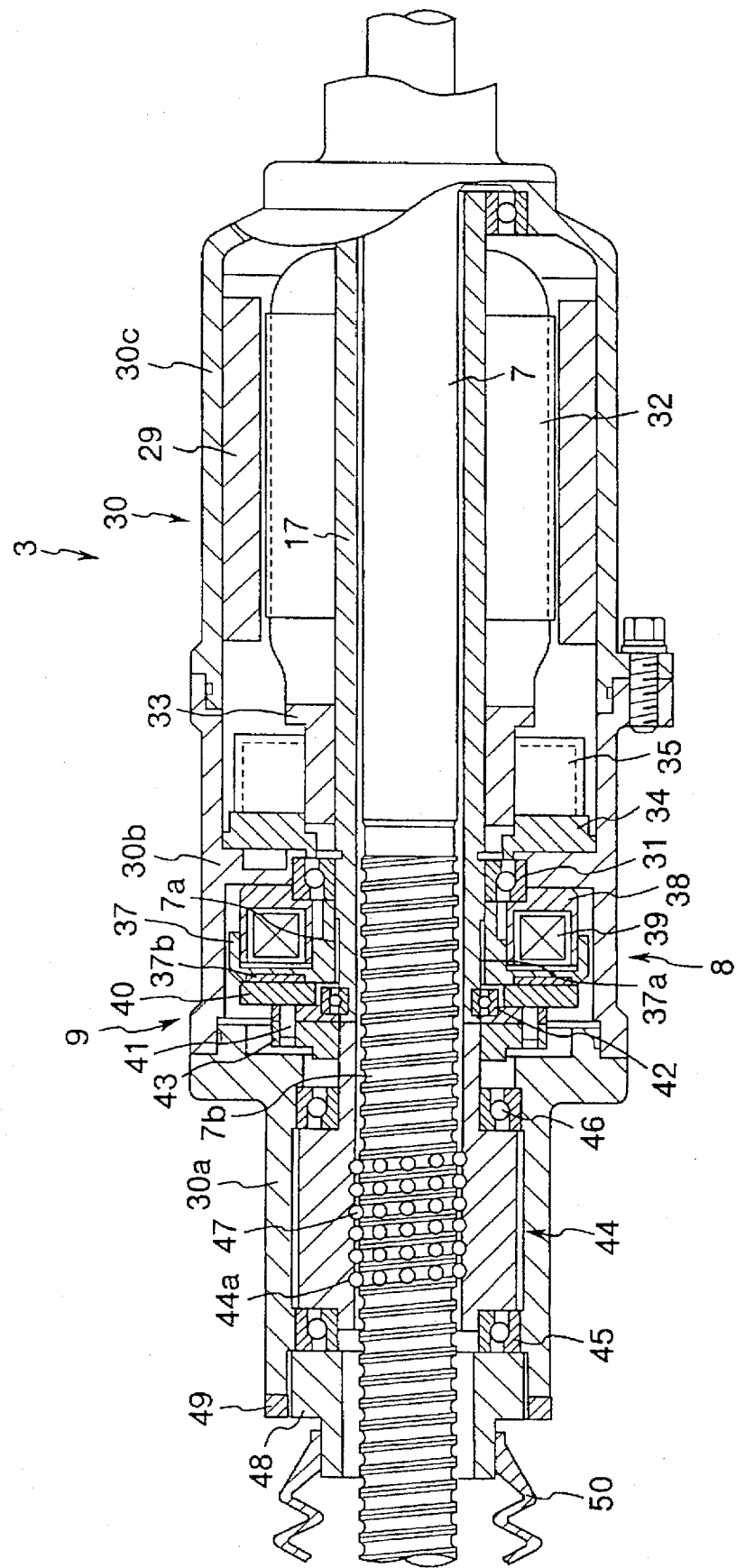
FIG. 2 is a magnified cross-sectional view of a main body 3 of the steering apparatus shown in FIG. 1.

In the operative state of the electrically-operated power steering apparatus, the rotation of the sleeve 17 shown in FIG. 2 causes rotation of the ball screw nut 44 through the clutch plate 40. The rotation of the ball screw nut 44, which is rendered rotatable relative to the housing 30 but incapable of movement in the axial direction, presses the external screw groove 7b of the rack shaft 7 in the axial direction across the balls 47, thereby moving the rack shaft 7 in the axial direction and achieving steering operation by means of unrepresented tie rods linked to the rack shaft 7. At the rotation of the ball screw nut 44, the balls 47 roll along the rolling path constituted by the screw grooves 7b, 44a while being pressed by said screw grooves, and the ball 47 reaching an end of the internal screw groove 44a is circulated to the other end through the circulation path (not shown) formed in the ball screw nut 44.

As the balls 47 are comprised of the standard-diameter balls and the small-diameter balls alternately arranged in succession in the rolling path as explained above, the gap of the screw grooves defined by the standard-diameter balls is somewhat loose for the small-diameter balls. Consequently the frictional force which the small-diameter ball receives from the screw grooves (groove-ball frictional force) becomes smaller than that which the standard-diameter ball receives from the screw grooves, so that both balls receive different rolling forces. Consequently, when the standard-diameter ball and the small-diameter ball come in mutual contact in the low load state, the small-diameter ball continues the sliding or rolling motion while the standard-diameter ball continues the rolling motion, whereby the sticking phenomenon can be prevented.

However, if the diameter of the small-diameter balls is considerably smaller than that of the standard-diameter balls, the force between the screw grooves is solely received by the standard-diameter balls, so that the transmission capacity is decreased. On the other hand, the above-mentioned effect can scarcely be expected if the diameter of the small-diameter balls is substantially equal to that of the standard-diameter balls. For achieving the above-explained effect and also causing the small-diameter ball to support about 60% of the load received by the standard-diameter ball even in the high load state, it has been found that the diameter Db of the small-diameter balls should be within the following range:

$$Da-4Da/1000 \leq Db \leq Da-Da/1000$$

wherein Da is the diameter of the larger, standard-diameter balls.

The tolerance in size of the balls 47 employed in such ball screw mechanism is usually smaller than Da/1000, so that the effect of the present invention cannot be expected even if balls of a size at the lower limit of such tolerance are mixed in the balls of such mechanism.

The ball arrangement of the invention is not to be construed as limited to that of the foregoing embodiment, and is subject to suitable variations or modifications. For example the standard-diameter balls and the small-diameter balls need not necessarily be arranged alternately, but can also be arranged in such a manner that two or more small-diameter balls are arranged in succession between two standard-diameter balls. Also there may be employed small-diameter balls of two or more different diameters, as long as they all meet the aforementioned condition for diameter.

In the following there will be explained a second embodiment of the invention. Here, in addition to the feature of first embodiment, the pitch circle diameter of the ball screws of the ball screw shaft is improved.

Figure 3:
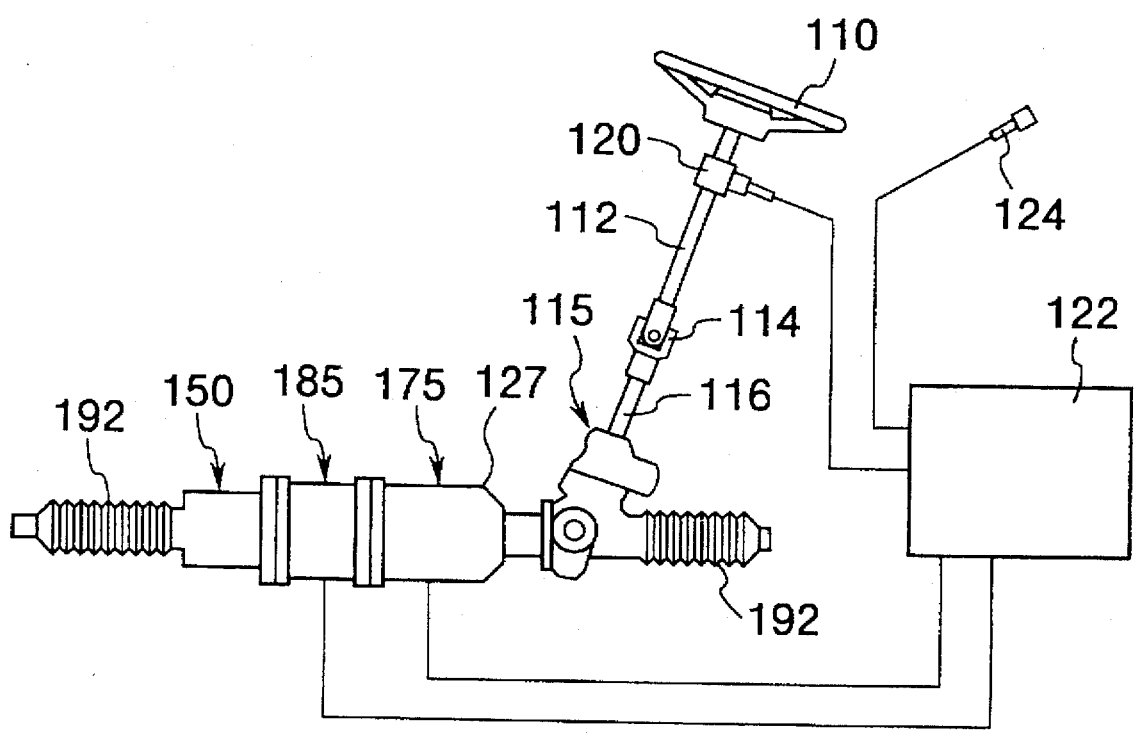
FIG. 3 is a schematic view of an embodiment of the present invention.

FIG. 3 illustrates an electrically-operated power steering apparatus provided with ball screw means of the present invention, wherein a steering wheel 110 is fixed on a steering shaft 112, which is linked, by a universal joint 114, to a pinion shaft 116 of a rack-pinion gear means 115. Said pinion shaft 116 is provided, at the front end thereof, with a pinion gear (not shown), meshing with a rack (not shown) formed on a rod-shaped power transmission member 130 (see FIG. 4A) provided movably in a main body 127 of the steering apparatus. Said rack-pinion gear means 115, being already known, will not be explained in detail.

In the main body 127, composed of a housing 121, 123, 125, there are provided an electric motor 175, ball screw means 150 and a clutch 185 for auxiliary power supply, and the rotary force of the electric motor 175 is transmitted through the ball screw means 150 to the power transmission member 130 as will be explained later.

On the steering shaft 112, there is provided a torque detector 120 for detecting the torque applied to the steering wheel 110, and the output of said torque detector 120 is supplied to a control circuit 122. To said control circuit 122 there are also connected a vehicle velocity detector 124 etc. The control circuit 122 is also connected to and controls the electric motor 175 and the clutch 185, based on the information on the torque applied to the steering shaft 112 and/or the vehicle velocity. On both ends of the power transmission member 130 there are provided ball joints (not shown), which are linked to steering running wheels in already known manner, for example through knuckle arms.

Figures 4, 4A:
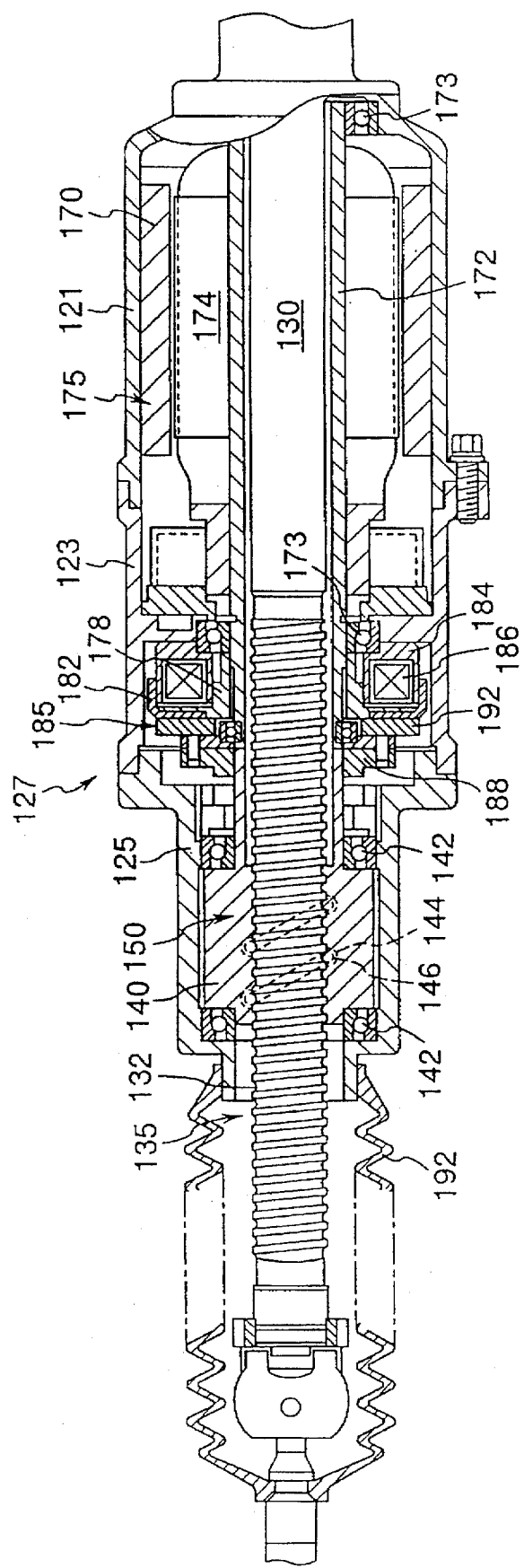
Figure 4B:
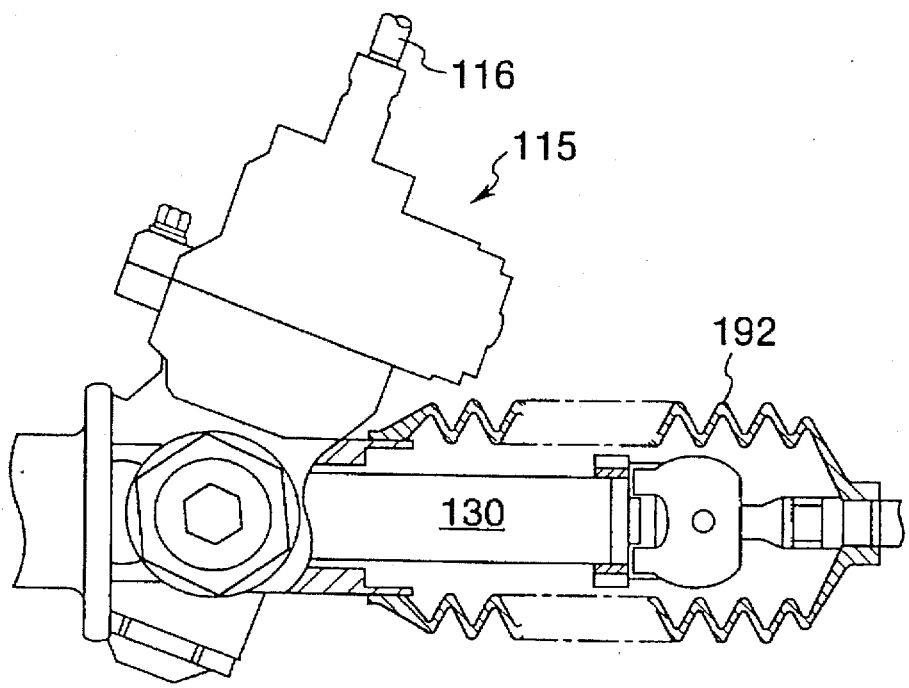

In the following there will be explained the details of the ball screw means and the associated mechanisms, with reference to FIGS. 4A and 4B.

Figure 5:
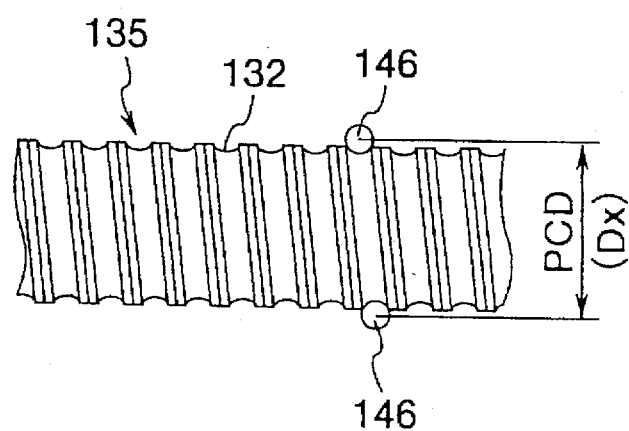
FIGS. 5 and 6 are views showing the details of a screw groove of the ball screw shaft shown in FIG. 4A.
Figure 6:
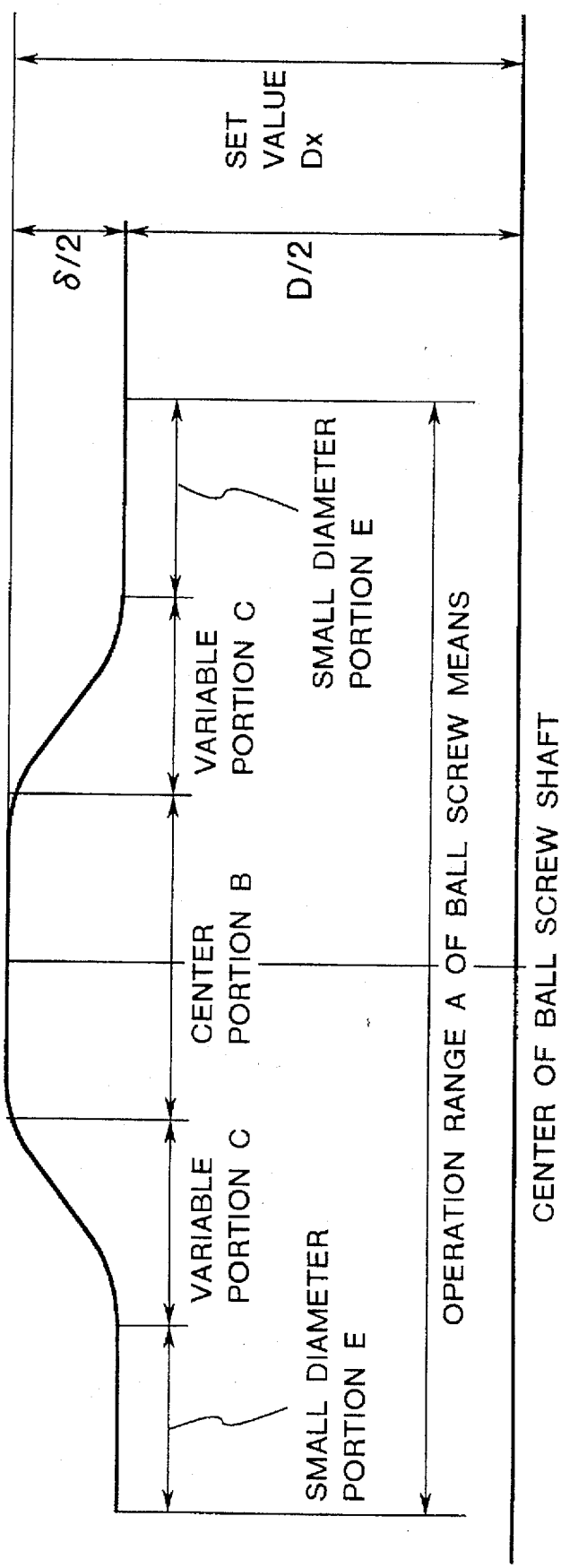

On the power transmission member 130, in a portion thereof separated from the rack, there is formed a spiral ball screw groove 132 to constitute a ball screw shaft 135, around which a ball nut 140 is fitted. The pitch circle diameter (PCD) of the ball screw shaft 135 (see FIG. 5) is not made constant over the entire operation range of the ball screw means 150 (movable range of the ball nut 140). As shown in FIG. 6 within the operating range A of the ball screw means 150, the set value Dx of the PCD is selected larger in a central region B, corresponding to the almost straight proceeding of the vehicle (corresponding to a range of rotation of the steering wheel of ±90° to the right and to the left), than the PCD of smaller diameter portions E by $\delta$ ($\geqq 0.005$ mm), and gradually varying portions C are formed between the central portion B and the smaller diameter portions E. The ordinary size of the PCD, appearing in the smaller diameter portions E, is about 23 mm to 30 mm. The central region B is about $\frac{1}{3}$ to $\frac{1}{6}$ of the operating range A.

The ball nut 140 is provided, on the internal periphery thereof, with a screw groove, and is supported by a bearing 142, rotatably with respect to the housing portion 123. The ball nut 140 is provided with two circulating paths 144 for the balls, and the ball screw means 150 is constituted by the ball screw shaft 135, the ball nut 140, the balls 146 etc. In the ball grooves, the balls 146 of standard-size and of small-size are disposed alternately, same as the first embodiment.

At the assembly of the ball nut 140 on the ball screw shaft 135, the setting of the pressure or the small gap is conducted with reference to the PCD of the central region B.

A stator 170 is provided on the internal periphery of the housing 121. Outside the power transmission shaft 130, a cylindrical rotary shaft 172 is rotatably supported by a bearing 173, and a rotor 174 is fixed on said rotary shaft 172, radially facing said stator 170. Thus an electric motor 175 is composed of said stator 170 and rotor 174. The stator 170 is provided with a coil (not shown), receiving electric power from the control circuit 122 shown in FIG. 3.

An end of the rotary shaft 172 extends in the housing portion 123 and bears a U-sectioned tubular member 178, and a friction disk 182 is fixed integrally to an end of said tubular member. Also at an end of the housing portion 123 provided is a U-sectioned support ring 184, in which an annular coil 186 is provided and connected to the control circuit 122 shown in FIG. 3.

A rotation-receiving friction disk 192 is fixed to a flange member 188 mounted on the ball nut 140. The clutch 185 is composed of the friction disks 182, 192 and the coil 186.

The friction disk 192 is positioned opposite to the friction disk 182 but is normally not in engagement therewith. However, when the coil 186 is energized, the friction-receiving disk 192 is attracted toward said coil 186, thus moving to the right in FIG. 4A and comes into frictional engagement with the friction disk 182, whereby the rotary driving force of the electric motor 174 can be transmitted to the ball nut 140. Both ends of the housing 127 are protected by boot members 192.

In the following there will be explained the function of the present embodiment.

In the disconnected state of the clutch 185, the rotary shaft 172 of the electric motor 175 is separated from the ball nut 140. If the steering wheel 110 is manipulated in this state, the rotation thereof is converted by the rack-pinion gear means 115 into an axial movement of the power transmission member 130, thereby determining the direction of the steering running wheels through ball joints and knuckle arms (now shown).

On the other hand, in the connected state of the clutch 185, the rotary shaft 172 is coupled with the ball nut 140. When the steering wheel 110 is operated in this state, the torque corresponding to the external load received by the power transmission member 130 is detected by the torque detector 120, and the velocity of the vehicle is detected by a vehicle velocity detector 124, and both detected values are supplied to the control circuit 122. Thus the output of the electric motor 175 is controlled according to predetermined characteristics and based on these signals, and is transmitted through the ball screw means 150 to the power transmission member 130 for causing the axial movement thereof, thereby assisting the manual steering force applied by the steering wheel 110.

The pitch circle diameter (PCD) of the screw groove 132 of the ball screw shaft 135 is made larger in the vicinity of the neutral position of the steering wheel 110, where the steering operation is most frequently conducted, thereby reducing the size of the space between the screw groove 132 and the ball screw groove of the ball nut 140 smaller than the ordinary size. Consequently, even after repeated reciprocating motions of the ball screw shaft 135 within the ball nut 140 by the operation of the steering wheel 110, the space between the ball screw grooves does not expand beyond the ordinary size, so that the smooth movement conversion can be achieved over an extended period.

In the second embodiment, the difference $\delta$ in diameter between the central region B and the smaller diameter region E of the ball screw shaft 135 can be suitably selected in consideration of the diameter in the smaller diameter region E and the length of the central region B for example.

What is claimed is:

1. An electrically-operated power steering apparatus comprising:

a steering shaft to be directly connected to a steering wheel for integral rotation therewith;

a rack shaft capable of a linear movement for deflecting steerable vehicle wheels;

rack-pinion gear mechanism including a pinion gear, linked with said steering shaft and said rack shaft, to be rotated by said steering shaft, and a rack gear provided on said rack shaft to be meshed with said pinion gear;

a ball screw mechanism including a screw portion provided on said rack shaft, a rotary nut portion surrounding at least a part of said screw portion, and plural balls provided in succession in a rolling path formed between said rotary nut portion and said screw portion to transmit power between said rotary nut portion and said screw portion; and an electric motor unit connected to said rotary nut portion;

wherein said plural balls include balls of larger diameter and balls of smaller diameter positioned regularly among said larger diameter balls, the diameter Db of said smaller diameter balls satisfying the following condition:

$$Da-4Da/1000 \leq Db \leq Da-Da/1000$$

wherein Da is the diameter of said larger diameter balls.

2. An apparatus according to claim 1, wherein the larger diameter balls and the smaller-diameter balls are positioned alternately.

3. An apparatus according to claim 1, wherein a pitch circle diameter of the screw portion of said rack shaft is larger in an axially central region of said screw portion, corresponding to a range including a neutral position of the steering wheel, than at opposite end portions of said screw portion, and is gradually reduced from said central region to said end portions.

4. An apparatus according to claim 3, wherein a difference in the pitch circle diameter between the central region and the end portions is at least equal to 0.01 mm.

5. An apparatus according to claim 4, wherein the pitch circle diameter at said end portions is in a range of 23 to 30 mm.

6. An apparatus according to claim 5, wherein a length of said central region is ⅓ to ⅙ of an operating range of said ball screw mechanism.

* * * * *